US009181743B2

(12) United States Patent
Kashiwaguma

(10) Patent No.: US 9,181,743 B2
(45) Date of Patent: Nov. 10, 2015

(54) DOOR OPENING/CLOSING DEVICE UNIT AND METHOD FOR MOUNTING THE SAME

(75) Inventor: Kazuaki Kashiwaguma, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 16 days.

(21) Appl. No.: 13/559,129

(22) Filed: Jul. 26, 2012

(65) Prior Publication Data

US 2013/0026114 A1 Jan. 31, 2013

(30) Foreign Application Priority Data

Jul. 29, 2011 (JP) ................................ 2011-166257

(51) Int. Cl.
*A47B 96/06* (2006.01)
*A47G 29/18* (2006.01)
(Continued)

(52) U.S. Cl.
CPC ............. *E05D 15/40* (2013.01); *E05Y 2201/62* (2013.01); *E05Y 2201/706* (2013.01); *E05Y 2600/56* (2013.01); *E05Y 2900/132* (2013.01); *Y10T 29/49826* (2015.01)

(58) Field of Classification Search
CPC ........... E05D 15/44; E05D 3/14; E05D 11/00; E05D 15/46; B44D 3/123; A46B 17/02; A47J 43/287; A47J 47/20; A47K 5/02; E05Y 2900/132; E05Y 2201/62; E05Y 2201/706; E05Y 2600/56
USPC ......... 248/201, 213.1, 276.1, 284.1; 312/322, 312/323, 327; 29/428; 16/283, 286, 280, 16/281, 282, 287, 288, 289, 290, 293, 294, 16/302, 306, 366, 368, 369, 370, 291; 211/27
See application file for complete search history.

(56) References Cited

U.S. PATENT DOCUMENTS

| | | | | |
|---|---|---|---|---|
| 3,596,861 A * | 8/1971 | Baldini | .................... | A47K 5/02 248/223.41 |
| RE28,994 E * | 10/1976 | Aylworth | ............. | E06B 3/5045 312/139.2 |

(Continued)

FOREIGN PATENT DOCUMENTS

| | | |
|---|---|---|
| DE | 2849901 | 5/1980 |
| EP | 0 851 084 | 7/1998 |

(Continued)

OTHER PUBLICATIONS

Notification of Reasons for Refusal issued Apr. 16, 2013 by the Japanese Patent Office in Japanese Patent Application No. 2011-166257 with English translation, 7 pages.

(Continued)

*Primary Examiner* — Jonathan Liu
*Assistant Examiner* — Muhammad Ijaz
(74) *Attorney, Agent, or Firm* — Young & Thompson

(57) ABSTRACT

Provided is a door opening/closing device unit which is capable of preventing shifting of the mounting position of a connecting rod to door opening/closing devices and facilitating the mounting work. The door opening/closing device unit has at least one support member 8 mountable on a housing 1, a pair of door opening/closing devices 4 for moving a door 2 relative to the housing 1 and a connecting member 5 for connecting the door opening/closing devices so as to synchronize operations of the door opening/closing devices. First the support member 8 is mounted on the housing 1, and then, at least one of the paired door opening/closing devices 4 connected by the connecting member 5 is mounted on the one support member 8.

7 Claims, 10 Drawing Sheets

DETAIL VIEW OF PORTION II

(51) Int. Cl.

| | |
|---|---|
| ***B67B 5/00*** | (2006.01) |
| ***F16L 3/08*** | (2006.01) |
| ***E05D 15/40*** | (2006.01) |
| *E04G 3/00* | (2006.01) |
| *E04G 5/06* | (2006.01) |
| *E05D 1/00* | (2006.01) |
| *E05D 3/00* | (2006.01) |
| *E05D 7/00* | (2006.01) |
| *E05D 11/00* | (2006.01) |
| *F16C 11/00* | (2006.01) |

(56) References Cited

U.S. PATENT DOCUMENTS 4,007,514 A * 2/1977 Salice .............................. 16/240
4,692,964 A * 9/1987 DeBruyn .................. E05D 3/10 16/367
4,783,131 A * 11/1988 Grass ...................... E05D 15/44 312/276
5,524,979 A * 6/1996 Carson .................. E05D 15/582 16/362
7,017,231 B2 * 3/2006 Isele ..................... E05D 7/0407 16/236
7,794,028 B2 9/2010 Brunnmayr
8,011,741 B2 * 9/2011 Mattle ................... E05D 15/401 312/319.5
8,376,480 B2 * 2/2013 Brunnmayr ............... E05D 3/06 312/319.2
8,468,653 B2 * 6/2013 Tumler ................... E05D 11/10 16/286
2001/0039762 A1 * 11/2001 Giovannetti .......... E05F 1/1091 49/246
2008/0054771 A1 * 3/2008 Brunnmayr ............... E05D 3/14 312/323
2009/0261696 A1 * 10/2009 Hollenstein ............ A47B 77/00 312/327
2010/0283365 A1 * 11/2010 Chen ...................... A47B 88/14 312/334.4
2011/0001410 A1 * 1/2011 Chen ..................... E05D 15/582 312/322
2011/0204072 A1 * 8/2011 Sugasawara ............ E05D 15/34 220/810
2012/0000130 A1 * 1/2012 Kashiwaguma ...... E05F 1/1058 49/348
2012/0181909 A1 * 7/2012 Isele ....................... E05D 15/46 312/298
2013/0160244 A1 * 6/2013 Sayama .................... E05D 3/18 16/370
2014/0191632 A1 * 7/2014 Steinhauser ............ E05D 15/40 312/110

FOREIGN PATENT DOCUMENTS

| | | | |
|---|---|---|---|
| EP | 2 325 425 | 5/2011 | |
| JP | 63-194660 | 12/1988 | |
| JP | 1-171273 | 12/1989 | |
| JP | 11-113646 | 4/1999 | |
| JP | 2004-339906 | 12/2004 | |
| JP | 2004-360180 | 12/2004 | |
| JP | 2008-538938 | 11/2008 | |
| WO | WO 2010/097996 | 9/2010 | |
| WO | WO 2010097996 A1 * | 9/2010 | ............ E05F 1/1058 |
| WO | WO 2010108203 A1 * | 9/2010 | |

OTHER PUBLICATIONS

European Search Report—12177560.5—Oct. 2, 2014.

* cited by examiner

DETAIL VIEW OF PORTION II

DETAIL VIEW OF PORTION IV

DETAIL VIEW OF PORTION VI

DETAIL VIEW OF PORTION X

CROSS SECTIONAL VIEW ALONG LINE b-b

CROSS SECTIONAL VIEW ALONG LINE c-c

DOOR OPENING/CLOSING DEVICE UNIT AND METHOD FOR MOUNTING THE SAME

BACKGROUND OF THE INVENTION

1. Field of the Invention

The present invention relates to a door opening/closing device unit and a method for mounting the same, the door opening/closing device unit having a synchronized pair of door opening/closing devices for moving a door relative to a housing.

2. Related Art

There is known a cabinet of which the door is moved by a pair of door opening/closing devices mounted on the housing in order to facilitate the opening and closing operation of the door relative to the housing (see Japanese Patent Application Laid-Open No. 2008-538938). The paired door opening/closing devices are mounted on inner surfaces of left and right side walls, respectively, of the housing. Each of the door opening/closing devices has two links between the housing and the door thereby to determine the attitude of the door when opening and closing the door.

The paired door opening/closing devices disclosed in JP2008-538938 mentioned above are connected to each other via a connecting rod. The connecting rod is provided for the purpose of synchronizing the operations of the right and left door opening/closing devices. If no connecting rod is provided, the paired door opening/closing devices will be movable independently, which causes a problem of the door slanted or swayed in opening and closing operations. The connecting rod is required particularly for a wide housing.

The conventional door opening/closing devices are mounted on the housing in the following manner . First, the door opening/closing devices are mounted on the respective inner surfaces of the side walls of the housing with use of fastening members such as screws. Then, the connecting rod is provided to run between the paired door opening/closing devices and both axial ends of the connecting rod are fixed to the paired door opening/closing devices.

Here, there have been various ideas made to fix the connecting rod to the paired door opening/closing devices. JP2008-538938 discloses that a notch is provided on a rotational shaft of a link of the door opening/closing devices, a cuboid part is formed at an axial end of the connecting rod for fitting the notch, the cuboid part of the connecting rod is fit in the notch off the rotational shaft, and then, they are fixed to each other with screws. Besides, JP2008-538938 also discloses the connecting rod being extensible. A polygonal part is formed at each axial end of the extensible connecting rod, a polygonal recess is formed in the rotational shaft of the link of the door opening/closing device and the polygonal part of the extended connecting rod is inserted in the polygonal recess of the rotational shaft. Meanwhile, the Japanese Patent Application Laid-Open No. 2004-339906 discloses links of a pair of left and right door opening/closing devices which are connected by a plate-shaped connecting member at the position away from the rotational shafts of the links.

In the inventions disclosed in the above-mentioned publications, the paired door opening/closing devices are first mounted on the inner surface of the paired side walls, respectively, of the housing and then, the door opening/closing devices mounted on the side walls are fixed to ends of the connecting rod. In such a case, there will be no problem as long as each door opening/closing device is mounted at a proper position of the side wall of the housing, however, if the mounting position is shifted, the connecting rod cannot be fixed or even when the connecting rod can be mounted, it may be deformed problematically. Therefore, there is need to mount the door opening/closing device on the side wall of the housing again and mounting work becomes troublesome.

The present invention was carried out to solve the above-described problems of the conventional door opening/closing devices, and aims to provide a door opening/closing device unit and a method for mounting the same capable of preventing shifting of the mounting position of the connecting rod to the door opening/closing devices and facilitating the mounting work.

BRIEF SUMMARY OF THE INVENTION

In order to solve the above-mentioned problems, an aspect of the present invention is a door opening/closing device unit comprising: a least one support member which is mountable to a housing; a pair of door opening/closing devices configured to move a door relative to the housing; and a connecting member configured to connect the door opening/closing devices so as to synchronize operations of the door opening/closing devices, wherein when the support member is mounted to the housing, at least one of the door opening/closing devices connected by the connecting member is able to be mounted on the support member.

Another aspect of the present invention is a method for mounting a door opening/closing device unit that has a pair of door opening/closing devices for moving a door relative to a housing, the method comprising: connecting the door opening/closing devices with use of a connecting member so as to synchronize operations of the door opening/closing devices; mounting at least one support member on the housing; and mounting at least one of the door opening/closing devices connected by the connecting member onto the support member. In this aspect of the present invention, the step of connecting the door opening/closing devices with use of a connecting member so as to synchronize operations of the door opening/closing devices may be performed prior to or after the step of mounting at least one support member on the housing.

According to the present invention, as the paired door opening/closing devices are connected to each other by the connecting rod and then, the connected door opening/closing devices are mounted on the housing, it is possible to prevent the mounting position of the connecting member to the door opening/closing devices. Besides, as the door opening/closing devices are mounted on the housing via support members, the mounting work becomes easy and can be performed even by one worker (of course, the work can be done by two or more workers).

BRIEF DESCRIPTION OF THE SEVERAL VIEWS OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE INVENTION

Figure 1A:
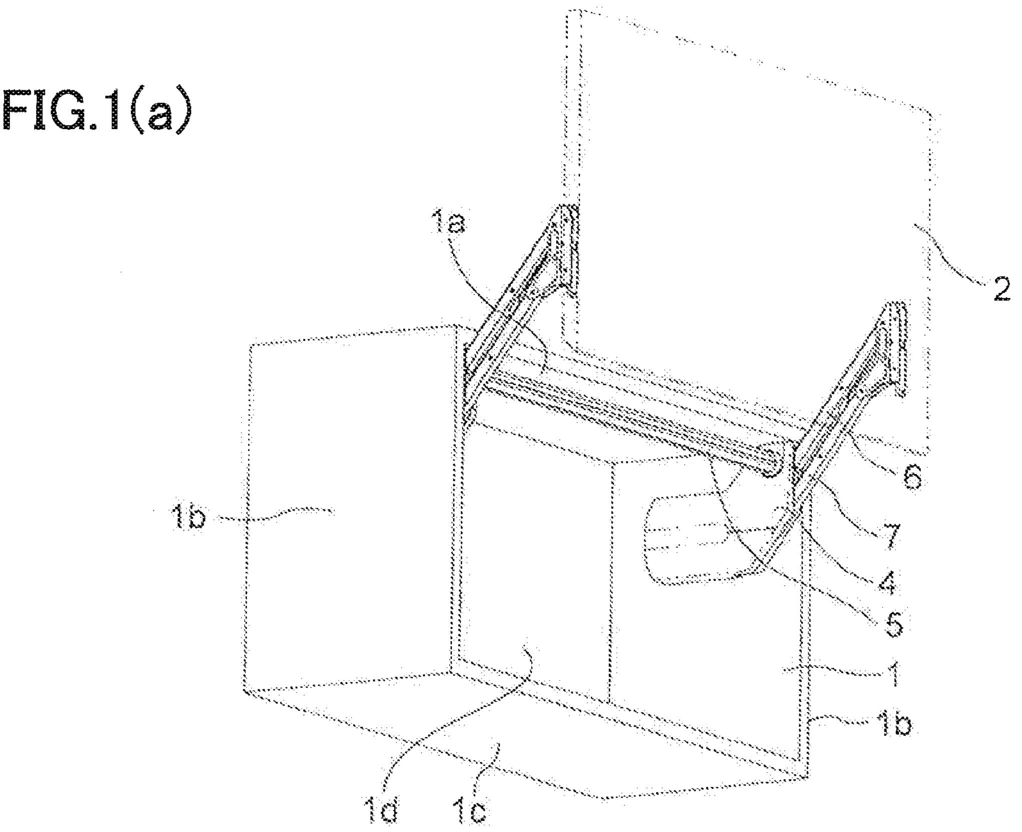
FIGS. 1(*a*) and 1(*b*) are perspective views of a shelf on which a door opening/closing device unit according to an embodiment of the present invention is mounted (FIG. 1(*a*) illustrating the door open and FIG. 1(*b*) illustrating the door closed)
Figure 1B:
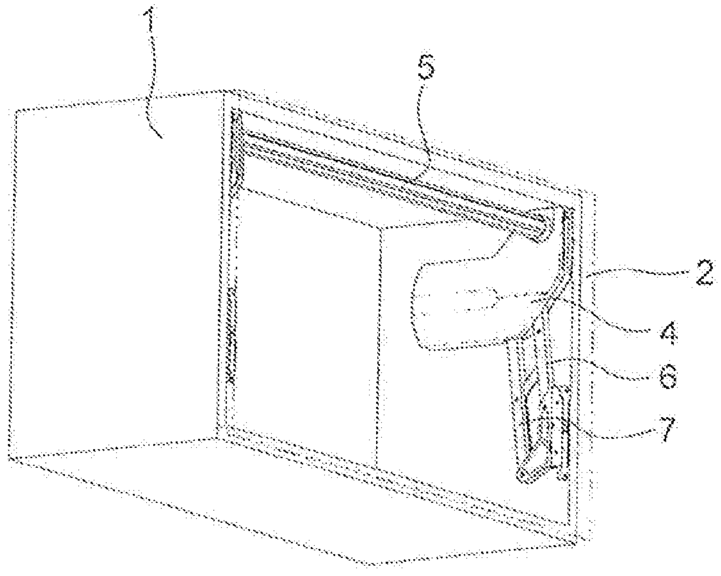

With reference to the drawings, a door opening/closing device unit according to an exemplary embodiment of the present invention will be described in detail below. The door opening/closing device unit is mounted on a housing 1 of furniture such as a cupboard in such a manner that a door can open and close relative to the housing 1. The housing 1 is open in a front surface and this opening is closed by the door 2 indicated by the chain double-dashed line in FIG. 1(*a*). FIG. 1(*a*) illustrates the door 2 open and FIG. 1(*b*) illustrates the door 2 closed.

The door 2 has a door knob (not shown) so that a person moves the door 2 upward to open the door 2 and downward to close the door 2. In order to open a heavy door 2 by a small force, the door opening/closing device 4 has a built-in spring for generating a force to assist the opening operation of the door 2. Besides, in order to attenuate the impact when opening and closing the door 2, the door opening/closing device 4 is provided with a damper for damping the opening and closing operations of the door 2. When opening and closing the door 2, the door 2 moves upward and downward while keeping its own attitude approximately in parallel with the housing 1. In order to parallel movement of the door 2, the door opening/closing device 4 has two links (auxiliary arm 6 and arm 7) that are approximately in parallel with each other and equal in length. The detailed structure of the door opening/closing device 4 will be described later.

The housing 1 is formed like a box and has an upper plate 1*a*, a pair of (left and right) side walls 1*b*, bottom plate 1*c* and a back plate 1*d*. On inner surfaces of the left and right side walls 1*b* of the housing 1, a pair of left and right door opening/closing device 4 is mounted, respectively. In order to synchronize the operations of the door opening/closing devices 4, the paired door opening/closing device 4 are connected by a connecting rod 5 as a connecting member.

Figure 2A:
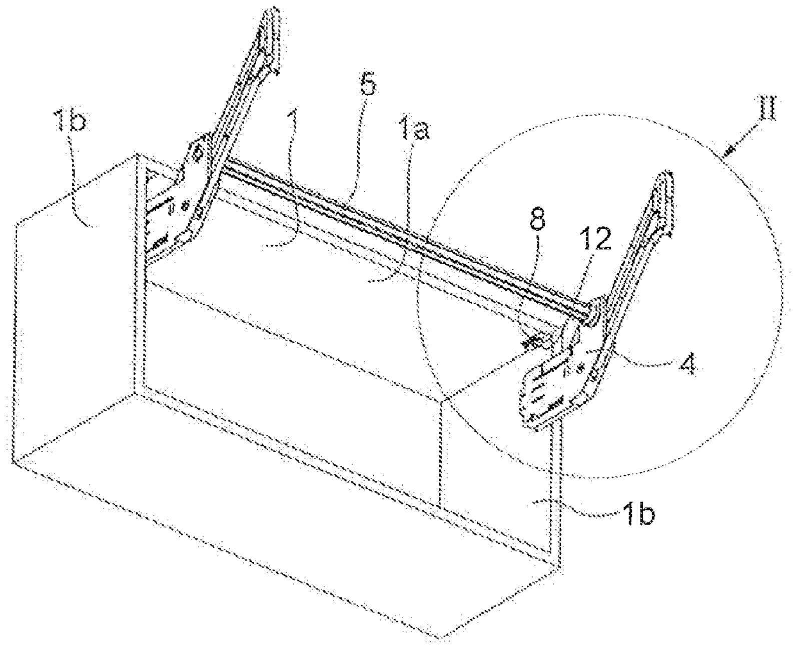
FIGS. 2(*a*) and 2(*b*) are process charts of mounting the door opening/closing device unit (FIG. 2(*a*) illustrating the step of mounting a pair of door opening/closing devices connected by a connecting rod on support members and FIG. 2(*b*) being a detail view of the portion II of FIG. 2(*a*))
Figure 2B:
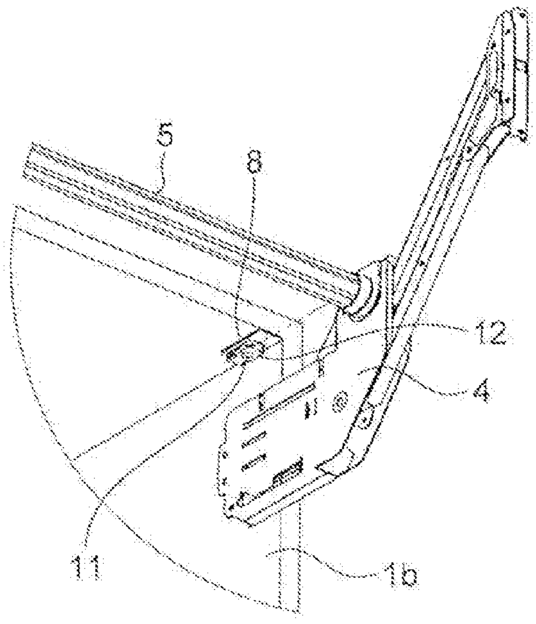

As illustrated in FIGS. 2(*a*) and 2(*b*), when mounting the paired door opening/closing devices 4 on the respective side walls 1*b* of the housing 1, the door opening/closing devices 4 are first connected to each other by the connecting rod 5, and then, the door opening/closing devices 4 in a connected state are mounted on the housing 1. Left and right support members 8 in a pair are mounted at corner portions of the upper plate 1*a*. Each support member 8 has a through hole 11 for inserting a fastening member 15 such as a screw (see FIG. 4). The support member 8 is fixed to the lower surface of the upper plate 1*a* by the fastening member 15. In the support member 8, an engaging part 12 is formed which has an inverted T shaped cross section. Each door opening/closing device 4 has a groove-shaped engaged part 21 formed therein for fitting the engaging part 12 (see FIG. 6). The detailed structure of the support member 8 will be described later.

Figure 3:
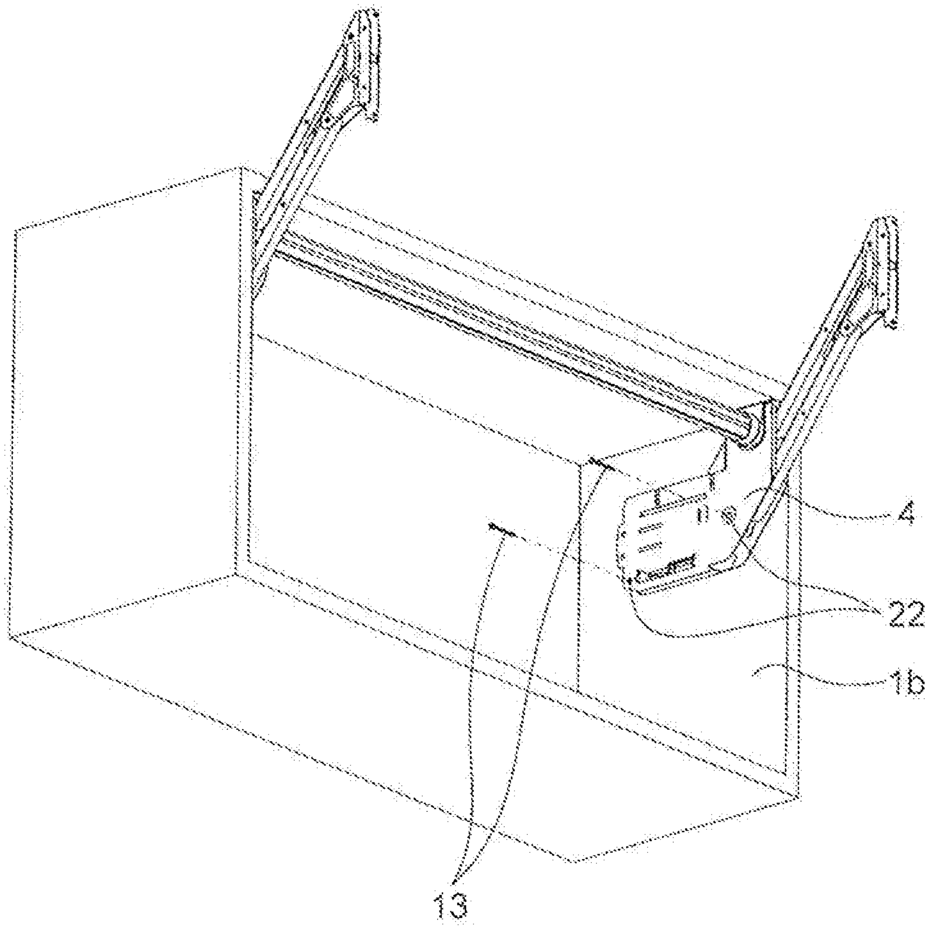
FIG. 3 is a process chart of mounting the door opening/closing device unit (step of fixing the paired door opening/closing devices to the side walls of the housing)

The paired door opening/closing devices 4 are mounted on the housing in the following manner. First, a worker fixes the left and right support members 8 to the lower surface of the upper plate 1*a* of the housing 1 with use of a fastening member such as a screw. At this time, the worker positions the support members 8 in such a manner that the front surface side of each of the support members 8 is flush with the front surface of the upper plate 1*a* (arranged in the same plane) and the side surface side of the support member 8 abuts to the side wall 1*b*. Then, the worker takes with both hands the door opening/closing devices 4 in pair which are already connected to each other by the connecting rod 5, fit the engaged part 21 of each of the door opening/closing devices 4 to the engaging part 12 of the support member 8 and slides the door opening/closing devices 4 in one direction (in the depth direction of the housing 1). Then, the paired door opening/closing devices 4 are mounted on the paired support members 8. When the door opening/closing devices 4 are mounted on the support members 8, the door opening/closing devices 4 are positioned at the proper positions of the housing 1. After that, as shown in FIG. 3, the worker fixes the door opening/closing devices 4 to the inner surfaces of the side walls 1*b* of the housing 1 by the fastening members 13 such as screws. In each of the door opening/closing devices 4, for example, two through holes 22 are formed for inserting the two fastening members 13. After being fixed to the side walls 1*b*, the door opening/closing devices 4 are covered with dressing covers.

According to the present embodiment, when fixing the door opening/closing devices 4 to the side walls 1*b* of the housing 1 with use of the fastening members 13, the paired door opening/closing devices 4 are supported by the paired support members 8. Therefore, the paired door opening/closing devices 4 can be prevented from falling down even if they get off the worker's hands and the screwing work can be performed by only one worker. On the other hand, if the door opening/closing devices 4 in the connected state are directly mounted on the housing 1 without the support members 8, the worker has to move his hand from one door opening/closing device 4 while screwing the other door opening/closing device 4 to the side wall of the housing 1. Therefore, the one door opening/closing device 4 drops down inevitably. In order to prevent the door opening/closing device 4 from dropping down, there needs another worker. Therefore, the mounting work cannot be performed by only one worker.

Figure 4A:
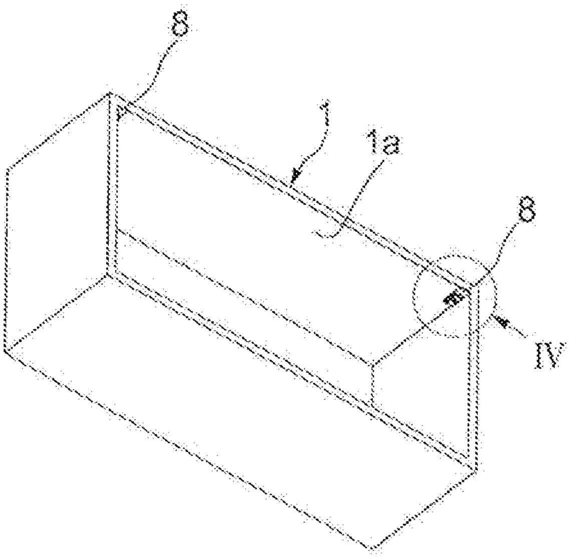
FIGS. 4(*a*) and 4(*b*) are perspective views of support members mounted on the housing (FIG. 4(*a*) is an overall view and FIG. 4(*b*) is a detail view of the portion IV of FIG. 4(*a*))
Figure 4B:
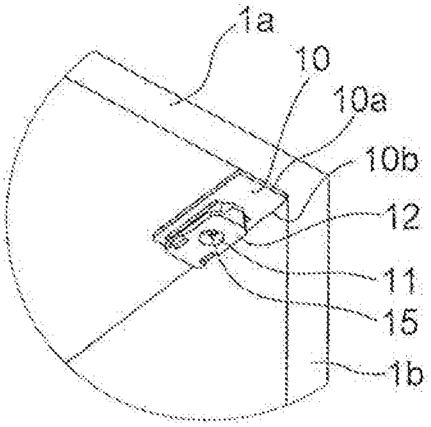

The structure of the support member 8 is described below. As illustrated in FIGS. 4(*a*) and 4(*b*), the paired support members 8 are mounted at the respective corner portions of the upper plate 1*a* of the housing 1. Each support member 8 has a plate-shaped body part 10 and the engaging part 12 that juts from the body part 10 downward. The support member 8 has a through hole 11 that passes through vertically in FIG. 4 (b) so as to be fixed to the lower surface of the upper plate 1*a* by the fastening member 15 such as a screw.

The body part 10 is formed like a rectangular plate. This body part 10 serves to position the support member 8 relative to the housing 1. Specifically, one front-side side (first positioning part) 10*a* of the body part 10 is positioned to be flush with the front surface of the upper plate 1*a* of the housing 1. As this one side 10*a* is positioned to be flush with the front surface of the upper plate 1*a* of the housing 1, the support member 8 can be positioned in the depth direction of the housing 1. Besides, one lateral-side side 10*b* (second positioning part) of the body part 10 is placed to abut against the side wall 1*b* in such a manner that the support member 8 is in parallel with the side wall 1*b*. The front-side side 10*a* and the lateral-side side 10*b* of the body part 10 form a right angle. As the lateral-side side 10*b* of the body part 10 abuts to the side wall 1*b* of the housing 1, the support member 8 is positioned in the horizontal direction of the housing 1.

Here, as far as the support member 8 can be positioned relative to the housing 1, the front-side side 10*a* and the lateral-side side 10*b* of the body part 10 need not be formed linearly. For example, a recess may be formed in the front-side side 10*a* of the body part 10, or the front-side side 10*a* may be formed protruding. Or, a plurality of jutting parts may be formed in the lateral-side side 10*b* of the body part 10 so that the jutting parts can abut against the side wall 1*b*. With these plural jutting parts, the support member 8 can be positioned in parallel with the side wall 1*b*.

Figure 5A:
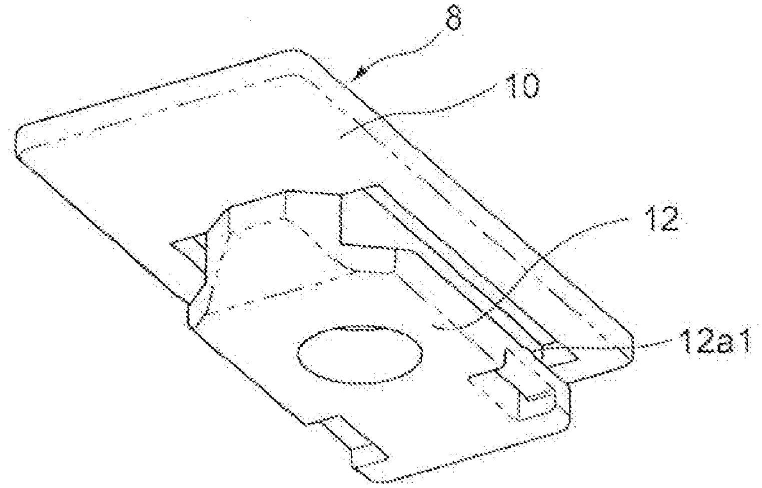
FIGS. 5(*a*) to 5(C) are detail views of a support member (FIG. 5(*a*) being a perspective view, FIG. 5(*b*) being a front view and FIG. 5(*c*) being a side view)
Figure 5B:
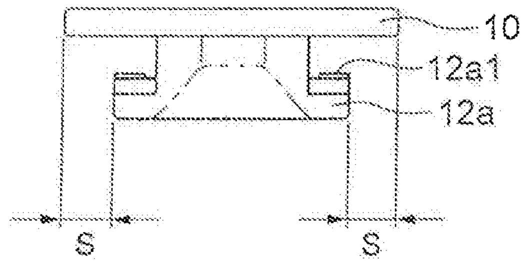
Figure 5C:
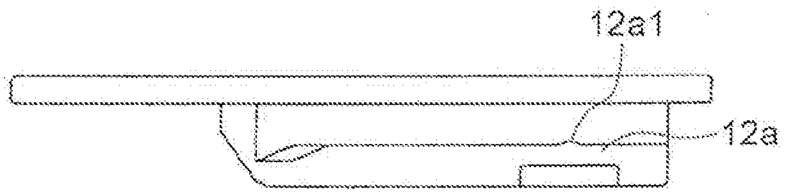

FIGS. 5(*a*) to 5(*c*) are detail views of the support member 8. The engaging part 12 having an inverted T shaped cross section juts downward from the body part 10 of the support member 8. The engaging part 12 extends in one direction (depth direction of the housing 1) while it keeps the inverted T shaped cross section. As illustrated in the perspective view of FIG. 5(*a*), the front end of the engaging part 12 is pointed toward its tip end so as to facilitate fitting of the engaged part 21 of the door opening/closing device 4. As illustrated in the front view of FIG. 5(*b*), when seen from the front side, the engaging part 12 is provided with an overhanging part 12*a* that overhangs left and right. In the upper surface of the overhanging part 12*a*, a positioning projection 12*a*1 is provided protruding upward. The horizontal size of the overhanging part 12*a* is smaller than the horizontal size of the body part 10. The support members 8 are provided symmetrical with respect to the center line in the horizontal direction and the size S from the end in the horizontal direction of the overhanging part 12*a* to the end of the body part 10 in the horizontal direction is equal at both ends in the horizontal direction. Accordingly, the left and right support members provided at respective left and right corners of the upper plate 1*a* of the housing 1 may be used interchangeably. As illustrated in the side view of FIG. 5(*c*), the overhanging part 12*a* provided with the positioning projection 12*a*1 is formed thinner than the other part so that it can be deformed.

Figure 6A:
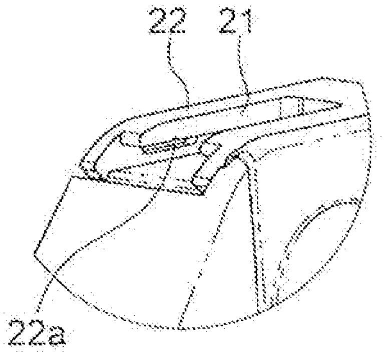
FIGS. 6(*a*) and 6(*b*) are perspective views illustrating an engaged groove 21 of the door opening/closing device (FIG. 6(*a*) being a detail view of the portion VI of FIG. 6(*b*) and FIG. 6(*b*) being an overall view)
Figure 6B:
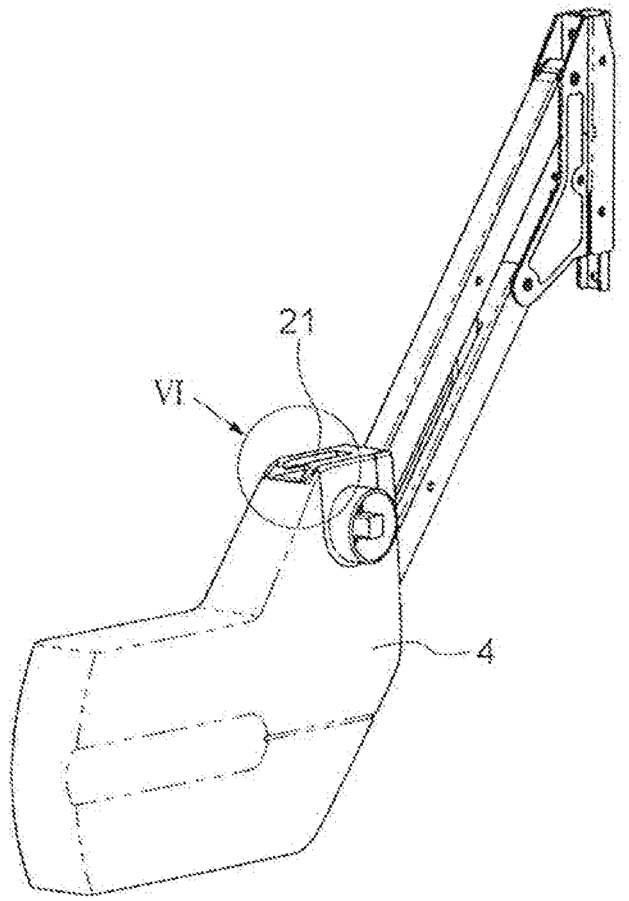

FIGS. 6(*a*) and 6(*b*) illustrates the engaged part 21 of the door opening/closing device 4 for fitting the engaging part 12 of the support member 8. In each of the door opening/closing devices 4, the engaged part 21 is formed which is an inverted T shaped groove conforming to the cross sectional shape of the engaging part 12 of the support member 8. The groove of the engaged part 21 extends in one direction (in the depth direction of the housing 1) while keeping the inverted T shape cross section. In the lower surface of an upper wall that defines the engaged part 21, a positioning recess 22*a* is formed.

Figure 7:
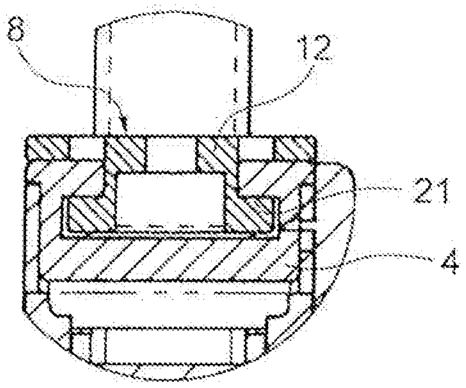
FIG. 7 is a cross sectional view illustrating the engaged part of the door opening/closing device to the engaging part of the support member (cross section orthogonal to the depth direction of the housing)

FIG. 7 illustrates the engaged part 21 of the door opening/closing device 4 fit to the engaging part 12 of the support member 8. FIG. 7 is a cross sectional view taken along the direction perpendicular to the depth direction of the housing 1. As illustrated in FIG. 7, the engaging part 12 of the support member 8 has an inverted T shaped cross section, the engaged part 21 of the door opening/closing device 4 has a revered T shaped cross section and, which shapes are approximately in agreement with each other so that the engaging part 12 and the engaged groove 21 fit to each other. When the engaged part 21 of the door opening/closing device 4 is fit to the engaging part 12 of the support member 8, the door opening/closing device 4 is positioned relative to the support member 8 in the front direction and vertical direction of the housing 1. The door opening/closing device can be mounted on the support member 8 by fitting the engaged part 21 of the door opening/closing device 4 to the engaging part 12 of the support member 8 and then sliding the door opening/closing device 4 in the depth direction of the housing 1.

Figure 8A:
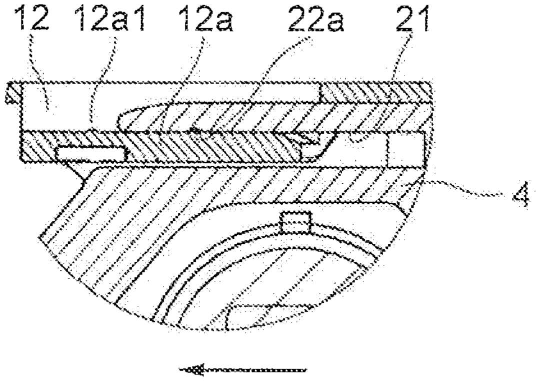
FIGS. 8(*a*) and 8(*b*) are cross sectional views of the engaged part of the door opening/closing device which is fit to the engaging part of the support member (cross sectional views taken along the depth direction of the housing, FIG. 8(*a*) illustrating the engaged part sliding and FIG. 8(*b*) illustrating the engaged part after being slid)
Figure 8B:
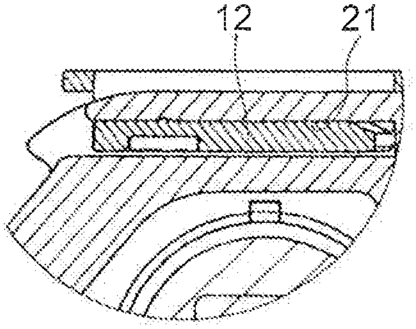

FIGS. 8(*a*) and 8(*b*) are cross sectional views of the engaging part 12 of the support member 8 and the engaged part 21 of the door opening/closing device 4, taken along the depth direction of the housing 1. FIG. 8(*a*) illustrates the door opening/closing device 4 that has just started sliding and FIG. 8(*b*) illustrates the door opening/closing device 4 that has finished sliding. As illustrated in FIG. 8(*a*), the positioning projection 12*a*1 is formed in the upper surface of an overhanging part 12*a* of the support member 8. The overhanging part 12*a* in which the positioning projection 12*a*1 is formed is formed partially thin. When inserting the positioning projection 12*a*1 of the support member 8 into the engaged part 21 of the door opening/closing device 4, the thin part is deformed in the vertical direction. With this deformation, the overhanging part 12*a* of the support member 8 can be inserted into the engaged part 21 of the door opening/closing device 4.

As illustrated in FIG. 8(*b*), once the door opening/closing device 4 has finished sliding relative to the support member 8, the positioning projection 12*a*1 of the support member 8 returns into its original shape by the resilient restoration action and is fit in the positioning recess 22*a* of the door opening/closing device 4 so that the door opening/closing device 4 can be positioned relative to the support member 8 in the depth direction of the housing 1. With this positioning, the door opening/closing device 4 is prevented from getting out of the support member 8. The support member 8 is positioned in the front direction and depth direction relative to the housing 1 by the body part 10 of the support member 8. Besides, as the door opening/closing device 4 is positioned in the depth direction of the housing 1 relative to the support member 8, the door opening/closing device 4 can be positioned at the proper position relative to the housing 1.

Figure 9:
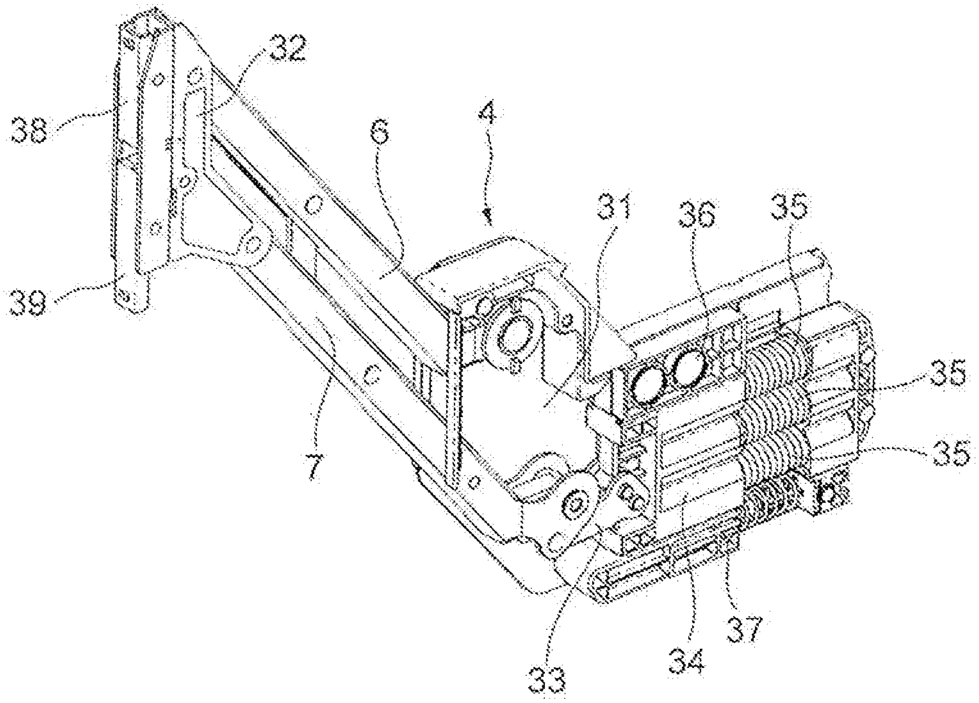
FIG. 9 is a view illustrating the inside structure of the door opening/closing device.

FIG. 9 illustrates the inside structure of the door opening/closing device 4. The door opening/closing device 4 has, as fundamental elements, a body part 31 which is mounted on the housing 1, two links (arm 7 and auxiliary arm 6) which are in parallel with each other and mounted rotatable on the body part 31, and a connecting member 32 which is fixed to the door 2. The arm 7 and auxiliary arm 6 have respective one ends in the longitudinal direction, which are fixed to the body part rotatable. The other ends are fixed rotatable to the connecting member 32. The body part 31, arm 7, auxiliary arm 6 and connecting member 32 form a parallel motion mechanism such that the door 2 moves approximately in parallel with the housing 1. Needless to say, the door 2 may not be in parallel as far as the attitude of the door 2 is stable during the opening and closing operations.

The arm 7 is connected to a running member 34 via a link arm 33. As the arm 7 rotates, the running member 34 moves linearly in the left and right direction in FIG. 9. The running member 34 is biased in one direction by a coil spring 35 and when the door 2 in the closed state gets open and the link arm 33 goes beyond the change point, the coil spring 35 gives the door 2 a biasing force in the closing direction. This force assists the opening and closing operations of the door 2.

On an upper part of the running member 34, a damper 36 is provided for attenuating the impact which is generated by opening the door 2. The damper 36 may be a linear damper using viscous fluid or a friction damper using friction. On a lower part of the running member 34, a damper 37 is provided for attenuating the impact which is generated by closing the door 2. This damper 37 may be also a linear damper or friction damper.

On the connecting member 32, a door-side mounting piece 38 fixed to the door 2 is mounted detachably. The door-side mounting piece 38 has a built in lever 39 which is biased by a coil spring (not shown). The lever 39 is configured to be movable vertically relative to the door-side mounting piece 38. When the door-side mounting piece 38 is attached to or detached from the connecting member 32, the lever 39 moves upward or downward automatically so as to enable mounting of the door 2 through one-touch operation.

Figure 10A:
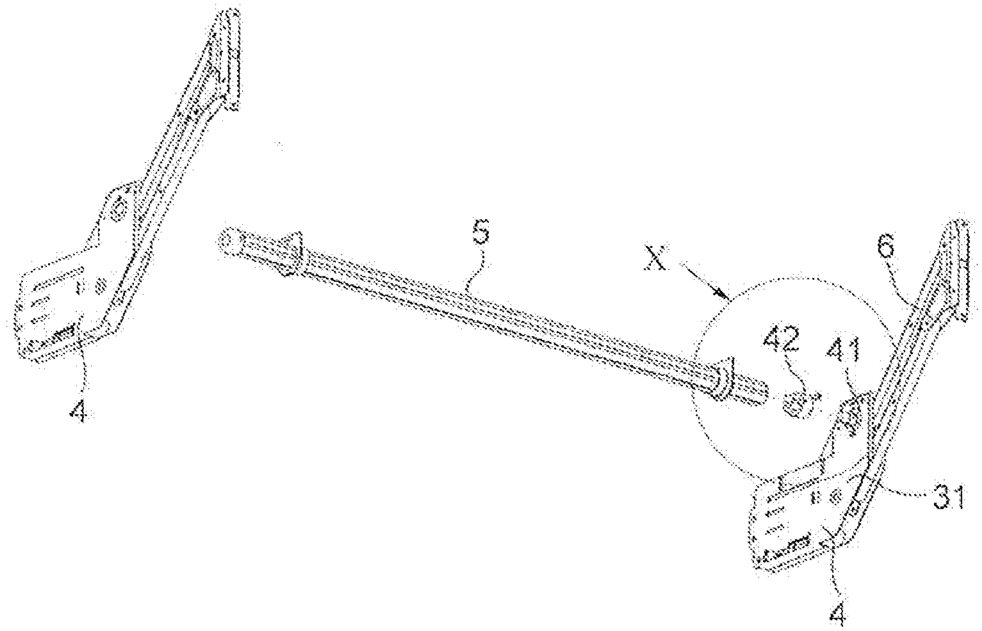
FIGS. 10(*a*) and 10(*b*) are exploded perspective views of the paired door opening/closing devices and the connecting rod (FIG. 10(*a*) being an overall view and FIG. 10(*b*) being a detail view of the portion X of FIG. 10(*a*))
Figure 10B:
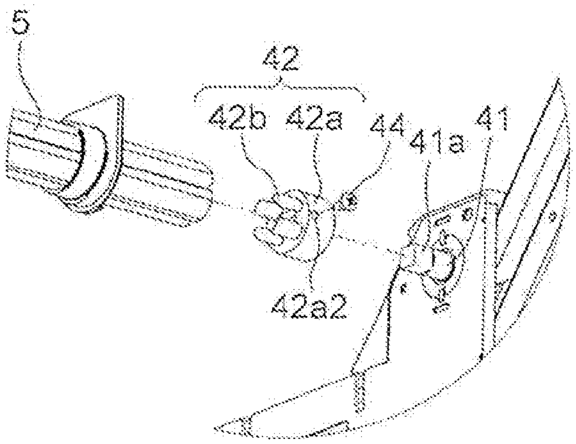
Figure 11A:
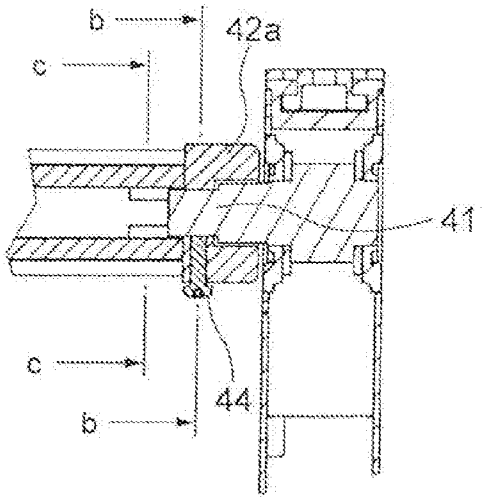
FIGS. 11(*a*) to 11(*c*) are cross sectional views each illustrating engagement of the connecting rod, joints and rotational shafts (FIG. 11(*a*) being a cross sectional view taken along the axis line of the rotational shaft, FIG. 11(*b*) being a cross sectional view taken along the line b-b of FIG. 11(*a*) and FIG. 11(*c*) being a cross sectional view taken along the line c-c of FIG. 11(*a*)).
Figure 11B:
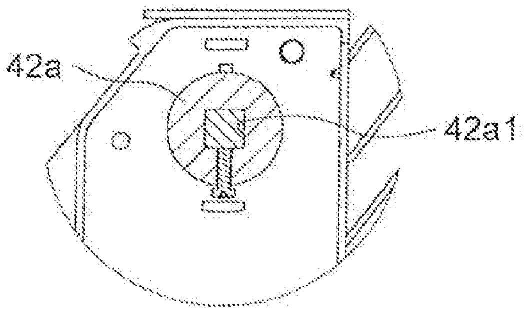
Figure 11C:
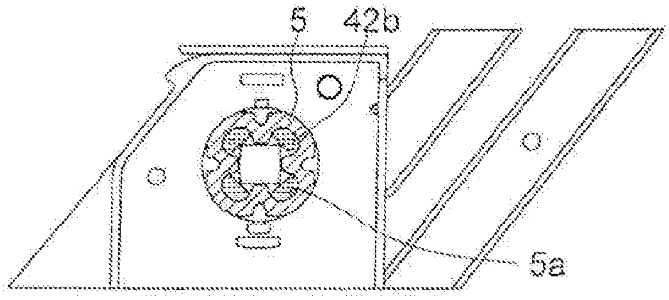

FIGS. 10(*a*) and 10(*b*) are exploded perspective views of the connecting rod 5 and paired door opening/closing devices 4. The auxiliary arm 6 of the door opening/closing device 4 has a rotational shaft 41, which protrudes from the body part 31. This rotational shaft 41 rotates together with the auxiliary arm 6. The rotational shaft 41 has an tip end 41*a* which has a rectangular cross section. Between the connecting rod 5 and the rotational shaft 41, a joint 42 is provided. The joint 42 has a cylindrical body part 42*a* and, for example, four protrusions 42*b* that protrude from the body part 42*a* toward the connecting rod 5. The body part 42*a* has a rectangular hole 42*a*1 formed therein (see FIG. 11(*b*)). The body part 42*a* is fit to the tip end 41*a* of the rotational shaft 41 and rotates together with the rotational shaft 41. In the body part 42*a*, a screw hole 42*a*2 is formed for screwing a stop screw 44. As illustrated in FIG. 11(*a*), the rotational shaft 41 is fit to the body part 42*a* of the joint 42 and the stop screw 44 is screwed to abut to the rotational shaft 41, thereby connecting the joint to the rotational shaft 41 unrotatably.

At an axial end of the connecting rod 5, four recesses 5*a* are formed for fitting the four protrusions 42*b* of the joint 42 thereinto (see FIG. 11(*c*)). As the projections 42*b* of the joint 42 are fit into the recesses 5*a* of the connecting rod 5, the connecting rod 5 rotates together with the joint 42. The joint 42 is provided at each end of the connecting rod 5 and the connecting rod 5 is prevented from getting out of the joint 42. The axial length of the connecting rod 5 is determined in accordance with the distance between the paired side walls 1*b* of the housing 1 and the horizontal size between the door opening/closing devices 4. Here, the connecting rod 5 of this embodiment is configured to be detachable after the door opening/closing devices 4 are mounted on the housing 1.

The present invention is not limited to the above-described embodiment and may be embodied in various modified forms without departing from the scope of the present invention.

For example, in the above-described embodiment, the left and right support members are fixed to the upper plate of the housing in order to prevent the left and right door opening/closing devices from falling down. However, the support members may be replaced with only one support member as far as the one support member is used to be able to prevent at least one of the left and right door opening/closing devices from falling down and the mounting work can be performed by only one worker. The support member is not limited to one mounted on the upper plate of the housing and may be mounted on a side plate of the housing. Besides, the support member is mounted at a corner of the bottom plate of the housing to be positioned to the bottom plate and the side wall. Further, the connected door opening/closing devices in pair may be slid to be mounted on the support members. Furthermore, each support member may be formed like a hook so that the connected door opening/closing devices in pair can be hooked and mounted on the support members.

The step of mounting the door opening/closing device on the side wall of the housing by a fastening member such as a screw may be omitted. When the door is light or door front is narrow, the door opening/closing device may be supported only by the support member.

The connecting rod may be formed like a plate or be mounted at a position away from the rotational shaft of the arm of the door opening/closing device.

The structure of the door opening/closing device is not limited to those according to the above-described embodiment as far as the attitude of the door is fixed. For example, a door opening/closing device may be used which has one link mounted rotatable on the housing, a slider sliding relative to the one link and a door mounted rotatable on the slider (see International Publication No. WO2010/097996).

The present invention is not limited to the above described embodiments, and various variations and modifications may be possible without departing from the scope of the present invention.

This application is based on the Japanese Patent application No. 2011-166257 filed on Jul. 29, 2011, entire content of which is expressly incorporated by reference herein.

What is claimed is:

1. A door opening/closing device unit with a housing, comprising:

at least one pair of support members to be mounted to an inner surface of the housing by a fastening member, said each of the support members having a positioning part for abutting an inner surface of a side wall of the housing;

a pair of door opening/closing devices having arms mounted rotatable to each of the door opening/closing devices and configured to move, relative to the housing, a door that opens and closes an opening in a front surface of the housing; and a connecting rod located inside the housing and configured to connect the arms of the door opening/closing devices so as to synchronize rotation of the arms of the door opening/closing devices, wherein at least one of the door opening/closing devices connected by the connecting rod is configured to be mounted on at least one of the support members, the door opening/closing devices are configured to be fixed to inner surfaces of left and right side walls of the housing, respectively, by fastening members, wherein each of the door opening/closing devices and the support members are separate bodies, and wherein, when the door opening/closing devices are mounted on the support members, a surface of the door opening/ closing device that contacts the inner surface of the side wall of the housing and the positioning part of the support member are in substantially a same plane.

2. The door opening/closing device unit and housing of claim 1, wherein the at least one of the door opening/closing devices connected by the connecting rod is mounted on one of the support members by sliding the door opening/closing devices in one direction relative to the support members.

3. The door opening/closing device unit and housing of claim 2, wherein the support member has a plate-shaped body part, and the body part has a first positioning part for positioning to an upper plate of the housing or a bottom plate of the housing and a second positioning part as the positioning part for abutting the side wall of the housing.

4. The door opening/closing device unit and housing of claim 2, wherein the each of the support members has an engaging part that is elongated in the one direction, the at least one of the door opening/closing devices has an engaged part that is elongated in the one direction and the engaged part is fit to the engaging part of the support members.

5. The door opening/closing device unit and housing of claim 4, wherein one of the engaging part and the engaged part is provided with a positioning projection so that the at least one of the door opening/closing devices can be positioned in the one direction relative to the support members and the other of the engaging part and the engaged part is provided with a positioning recess for fitting to the positioning projection.

6. The door opening/closing device unit and housing of claim 1, wherein the each of the support members are fixable to a lower surface of an upper plate of the housing or an upper surface of a bottom plate of the housing by a fastening member.

7. The door opening/closing device unit and housing of claim 1, wherein the support member has a plate-shaped body part, and the body part has a first positioning part for positioning to an upper plate of the housing or a bottom plate of the housing and a second positioning part as the positioning part for abutting the side wall of the housing.

* * * * *